United States Patent [19]

Ohkawa

[11] 4,141,805
[45] Feb. 27, 1979

[54] PRODUCTION OF HYDROGEN
[75] Inventor: Tihiro Ohkawa, LaJolla, Calif.
[73] Assignee: General Atomic Company, San Diego, Calif.
[21] Appl. No.: 655,387
[22] Filed: Feb. 5, 1976
[51] Int. Cl.² .............................................. B01J 1/10
[52] U.S. Cl. ...................... 204/157.1 H; 204/162 HE
[58] Field of Search ...................... 204/157.1 H, 162 H
[56] References Cited
U.S. PATENT DOCUMENTS

| | | | |
|---|---|---|---|
| 2,863,729 | 12/1958 | McDuffie et al. | 204/157.1 H |
| 3,092,561 | 6/1963 | Lampe | 204/157.1 H |

Primary Examiner—Howard S. Williams
Attorney, Agent, or Firm—Fitch, Even, Tabin & Luedeka

[57] ABSTRACT

Hydrogen is produced by bombarding a mixture of water and heavy elements having an atomic weight of at least about 40 with fast neutrons so as to cause thermal dissociation of the water to produce hydrogen ions following elastic collision of the fast neutrons with the heavy elements. The hydrogen ions are removed from the reaction zone to prevent recombination to water, maintaining conditions which favor combination to molecular hydrogen or combination with carbon to form hydrocarbons.

12 Claims, No Drawings

PRODUCTION OF HYDROGEN

This invention relates to the production of hydrogen and more particularly to a method for the production of hydrogen, or hydrogen-containing compounds useful for energy production, by the utilization of fast neutrons.

The cost of producing hydrogen in commercial quantities has risen substantially with the recent rise in the price of natural gas and petroleum feedstocks from which it has heretofore generally been produced. In addition to its present chemical usages, hydrogen has been mentioned as a possible way of storing electric energy until needed and then utilizing fuel cells or combustion processes to generate electricity. However, the high cost of hydrogen has heretofore limited its potential use in this fashion.

There are various sources of fast neutrons available at this time, and in the near future it is contemplated that fusion reactions will make available vast quantities of fast neutrons.

It is an object of the present invention to provide a method for the production of hydrogen and/or hydrogen-containing compounds utilizing the energy available in fast neutrons. It is a further object to provide an efficient, practical method for producing hydrogen from water utilizing the energy of fast neutrons. These and other objects of the invention will be apparent from reading the following detailed description.

Basically, it has been found that water or some other suitable compound can be split to release hydrogen atoms using the energy which is available in fast neutrons. For the purpose of this application, fast neutrons are defined as neutrons which have an energy greater than about 3 MeV, and neutrons having an energy of about 14 MeV are preferred. This method is based upon a first transfer or conversion of the kinetic energy of the fast neutron to kinetic energy of a suitable target atom, followed by an effecting of a chemical reaction, e.g. the splitting of water, as a result of the increased kinetic energy of the target atoms which creates an extremely high-temperature localized area.

In order for the reaction to effectively proceed, the target atoms or nuclei which are selected must have, as their greatest neutron cross section for fast neutrons, the cross section for elastic scattering. Target nuclei are chosen which have a cross section for elastic scatter of at least about 1.5 barns, preferably about 3 barns or greater. At the same time, the target nuclei which are chosen should have fast neutron cross sections for inelastic scatter, for capture, and for fission of less than one barn. Also, the target nuclei should have a substantially larger fast neutron cross section for elastic scattering than does the reactant, e.g. water, and preferably an elastic scatter cross section at least about three times as large. Generally, these criteria are found in heavy atoms, and accordingly target nuclei having an atomic weight of at least about 40, and preferably an atomic weight of about 80 or above, are selected. Atoms having lower mass numbers have a general tendency to undergo undesirable inelastic scattering with fast neutrons, and when they do undergo elastic scattering, it is accompanied by a significant increase in the velocity of the lighter elements that results in the creation of radiation energy which is not helpful in achieving thermal dissociation of the reactant.

The reactant, e.g. water, may be in either liquid or in vapor form, and the target nuclei may be a gas, a liquid or a solid. For example, a mixture of a gas or vapor with steam, a liquid mixture or suspension or an aqueous solution may be used. Some specific examples include xenon in steam and aqueous solutions of $BaI_2$ and of $SbCl_3$. However, a suspension is preferred for reasons set forth immediately hereinafter, and examples of suitable suspensions include particulate elemental lead and bismuth, as well as insoluble bismuth compounds and lead compounds.

Preferably, the target nuclei are heterogeneously distributed throughout the reactant so that, as a result of the transfer of kinetic energy to the target nuclei, transient thermal spikes or hot spots are created in localized areas which are at such an extremely high temperature as to cause the thermal dissociation of water into hydrogen and hydroxyl ions. Heterogeneity results in a clustering of the target nuclei which results in increase of overall efficiency of the hydrogen production method. Also, the reaction zone should contain a larger number of atoms of the heavy target elements than molecules of the reactant, e.g. water, and preferably the heavy target elements are employed in an atomic amount of at least about five times greater than the number of molecules of reactant, e.g. water.

Fast neutrons are available from various known neutron generators which can deliver them in suitable streams to a reaction zone of a suitable shape. Once in the reaction zone, it is anticipated that the fast neutron will undergo several elastic collisions with the target nuclides, thus incrementally giving up its kinetic energy. In addition, it is contemplated that fusion neutrons will be ideally suited for carrying out the method of invention, and in such an instance, neutrons which are produced by deuterium-deuterium fusion are in the energy range of about three to about four MeV whereas neutrons which result from the fusion of deuterium and tritium have an energy of about fourteen MeV, the latter being preferred.

In many instances, it will be preferred to employ a reaction zone which surrounds the neutron generation zone so that the fast neutrons will traverse the reaction zone as they travel outward in any direction from the location of their birth. With such an arrangement, two or more regions of the reaction zone could optionally be employed wherein the inner region would contain target nuclei having a particularly high cross section for elastic scatter with respect to very high energy level neutrons and wherein the outer region would contain different heavy elements having a particularly high cross section for elastic scatter with respect to neutrons of a slightly lower energy level. This arrangement would take maximum advantage of the decrease in kinetic energy of the fast neutrons as they travel outward undergoing elastic collisions as they proceed. One further aspect of the method is to achieve the removal of the hydrogen ions from the reaction zone without its recombination with the hydroxyl atoms to form water. In general, hydrogen ions have a higher diffusion rate than hydroxyl ions, and the tendency is for the hydrogen ions to combine with each other to form molecules of $H_2$ because of the concentration gradients that will result from this difference in diffusion rate. Alternatively, the reaction can be carried out under conditions which promote the combination of the hydrogen atoms with another element, for example, carbon, to form useful energy-producing compounds, for example, hydrocarbons. This can be done by slurrying carbon with an aqueous solution or suspension containing the target nuclei. Preferably, the atoms of carbon in such a slurry should at least equal the number of molecules of water.

As an example of carrying out the method of the invention, an aqueous suspension is formed containing about 90 mol percent of lead and about 10 mol percent water. Neutrons having an energy of about 14 MeV are directed into this reaction zone at a rate of about $10^{14}$ neutrons/sq.cm./sec. Elastic scattering occurs and produces small extremely hot regions involving groups of about $10^4$ to $10^5$ atoms of the heavy lead target nuclides which are found in the suspension. The temperature in these localized regions approaches a few electron volts for a duration of between about $10^{-11}$ and $10^{-10}$ seconds. The water molecules at this location are quickly dissociated, and the resultant hydrogen ions diffuse out of the localized regions more quickly than the hydroxyl moieties, thus preventing the re-formation of water. The hydrogen ions have a propensity for combination with one another to produce hydrogen molecules. It is found that these target nuclides are heavy enough to avoid electronic excitation and collide with other heavy nuclides creating the desired localized hot spots. Recombination to form water is statistically small so long as the high temperature region is localized in space and time and the efficient production of hydrogen results.

While the invention has been described with regard to certain preferred embodiments, it should be understood that changes and modifications as would be obvious to one having the ordinary skill in this art can be made without deviating from the scope of the invention which is defined solely by the claims appended hereto. Various features of the invention are set forth in the claims which follow.

What is claimed is:

1. A method for production of hydrogen which method comprises
    providing a mixture of water and heavy elements having an atomic weight of at least about 40 and a fast neutron cross section for elastic scatter of at least 1.5 barns and lesser cross sections for inelastic scatter, capture and fission, wherein there are more atoms of heavy elements present than there are molecules of water,
    bombarding said mixture in a reaction zone with fast neutrons so as to cause thermal dissociation of said water to produce hydrogen ions following elastic collision of said fast neutrons with said heavy elements, and
    combining said hydrogen ions within said reaction zone to prevent their recombination to water.

2. A method in accordance with claim 1 wherein said hydrogen ions are combined with one another to form molecular hydrogen.

3. A method in accordance with claim 1 wherein said hydrogen ions are combined with carbon to form hydrocarbons.

4. A method in accordance with claim 3 wherein said mixture includes a slurry of carbon in water.

5. A method is accordance with claim 1 wherein said mixture is a gaseous mixture.

6. A method in accordance with claim 5 wherein said heavy elements include xenon.

7. A method in accordance with claim 1 wherein said mixture is an aqueous solution containing said heavy elements as salts.

8. A method in accordance with claim 1 wherein said mixture is an aqueous suspension containing said heavy elements.

9. A method in accordance with claim 1 wherein the atoms of said heavy elements are present in an amount of at least about 5 times the molecules of water.

10. A method in accordance with cleim 1 wherein said neutrons have an energy of about 14 Mev.

11. A method in accordance with claim 10 wherein said heavy elements have a fast neutron cross section for elastic scatter at least 3 times the elastic scatter cross section of oxygen and have fast neutron cross sections for inelastic scatter, for capture and for fission of less than one barn.

12. A method in accordance with claim 10 wherein said reaction zone surrounds the location where said neutrons are generated and comprises inner and outer regions, with said heavy elements in said inner region having a higher elastic scatter cross section for said about 14 MeV neutrons than said heavy elements in said outer region of said reaction zone.

* * * * *